United States Patent [19]

Spector

[11] 3,809,782

[45] May 7, 1974

[54] TUBOCURARINE ANTIGENS AND ANTIBODIES SPECIFIC THEREFOR

[75] Inventor: Sidney Spector, Livingston, N.J.

[73] Assignee: Hoffmann-La Roche Inc., Nutley, N.J.

[22] Filed: Mar. 10, 1972

[21] Appl. No.: 233,814

[52] U.S. Cl. ........... 260/121, 23/230 B, 260/112 B, 260/112 R, 260/78 P, 424/12, 424/85, 424/88

[51] Int. Cl. ........................................ C07g 7/00

[58] Field of Search ................. 424/1, 12; 23/230 B; 260/112 X, 121

[56] References Cited

UNITED STATES PATENTS

| | | | |
|---|---|---|---|
| 2,388,260 | 11/1945 | Friedheim | 260/112 X |
| 2,957,808 | 10/1960 | Campbell | 424/12 |

OTHER PUBLICATIONS

Chem. Abstracts, Vol. 52, 1958, 14845c–d, Aladjemo et al.

Chem. Abstracts, Vol. 57, 1962, 4833e–f, Ehren preis

*Primary Examiner*—Howard E. Schain
*Attorney, Agent, or Firm*—Samuel L. Welt; Jon S. Saxe; Alan M. Krubiner

[57] ABSTRACT

Antigens are prepared by coupling tubocurarine derivatives to immunogenic carrier materials. The coupling is effected via a linking group derived from an amino acid involving an azo link to the tubocurare moiety and an amide linkage to the immunogenic carrier material. In preferred embodiments, proteins are used as the carrier materials. The resulting antigens produce immunological effects when injected into host animals, including the formation of antibodies specific for tubocurarine components in biological fluids.

6 Claims, No Drawings

TUBOCURARINE ANTIGENS AND ANTIBODIES SPECIFIC THEREFOR

BACKGROUND OF THE INVENTION

Curare components, most notably tubocurarine, its acid addition salts and quaternary ammonium salts find extensive use as relaxants of smooth muscle, particularly in conjunction with surgical procedures involving smooth muscle manipulation. Due to the fact that many curare components are deadly poisons, well known from their use by South American natives as arrow poisons, great care must be taken in their usage in medical procedures to avoid overdosage leading to respiratory paralysis. At present, techniques used to measure the levels of tubocurare derivatives present in a given subject are not very sensitive and are at best rather crude and subjective. A more highly sensitive assay for the presence of tubocurarine derivatives in a biological system would represent an extremely important advance in the art.

It has been known in the art for some time that various small molecules (haptens), which by themselves are wholly devoid of antigenicity, can modify the antigenic properties of a protein when a small molecule is combined with the protein through stable covalent linkages. In U.S. Pat. No. 2,372,066, patented Mar. 20, 1945, it is disclosed that antigens may be prepared by combining histamine or histamine-like compounds by linking the imidazole ring to a desired protein through a radical containing a group capable of coupling with the protein. These antigens are used either by direct injection into a subject whereby resistance, refractoriness or active immunity is developed in said subject or for injecting into host animals from which antibodies specific to the hapten moiety, e.g., the histamine or histamine-like substance are developed.

A similar contemporary disclosure was made by Lansteiner in the "Specificity of Serological Reactions," Harvard University Press, Cambridge, Mass. (1945) wherein p-amino benzene arsonic acid was coupled to a protein via its diazonium salt to form a chemically simple, well-defined compound which was antigenic and stimulated the production of antibodies. Furthermore, the antibodies to this immunogen (conjugated protein) can combine with the small molecule, e.g., the arsonic acid which is unattached to any protein. This antibody is quite specific in activity. For example, if an isomer of arsonilic acid, in which the $-AsO_3H$ group is in the meta position relative to the amino group, is utilized, it will not combine with the antibody formed against the protein-arsonilic acid complex in which the $-AsO_3H$ group is para to the amino group.

It should be mentioned that it is not yet possible, in the present state of the art, to predict or determine what properties are required to enable a molecule to act as an antigen. At one time, molecular weight and the possession of an aromatic group were thought to be the deciding factors. With time, the critical molecular weight required for antigenicity has been remarkably reduced. It is still believed, however, that the molecular weight will, to some extent, determine the antigenic capabilities of a molecule. Other factors such as molecular shape and chemical reactivity must also play a role in the antigenic properties and thus render prediction of such properties exceedingly more difficult.

DETAILED DESCRIPTION OF THE INVENTION

The present invention relates to a novel class of antigens comprising a tubocurarine hapten moiety coupled to an immunogenic carrier material. The coupling is effected via a linking group of the formula

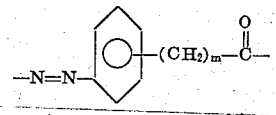

wherein $m$ is an integer of from 0 to 5.

This linking group is derived from an aminobenzoic acid ($m$ is 0) or an aminophenyl lower alkanoic acid ($m$ = 1 to 5). In preferred embodiments, the tubocurarine hapten is bonded via the linking group derived from p-aminobenzoic acid, to a protein. Additionally, the present invention relates to antibodies which would complex with some specificity to the tubocurarine hapten. These antibodies are produced by treating host animals with the aforesaid antigen. Such specific antibodies are readily isolated from sera obtained from host animals after treatment of these host animals with the antigen.

As used herein, the term "tubocurarine" or "tubocurarine derivative" is meant to include the d- and l-enantiomeric form of tubocurarine and its mono- or di-O-lower alkyl ethers, the acid addition salts thereof, (e.g., mono- or di-hydrochlorides or hydrobromides and the like); the quaternary ammonium salts thereof (e.g., mono-or di-methochlorides, methobromides, methiodides, and the like) and mixtures of the above. Preferred tubocurarine derivatives are those of the d-enantiomeric series, most preferably d-tubocurarine chloride.

As used herein, the term "immunogenic carrier material" is meant to include those materials which have the properties of independently eliciting an immunogenic response in a host animal when injecting therein and which can be coupled via a peptide linkage to a molecule having a free or activated carboxyl group. Suitable carrier materials include, for example, proteins; and natural or synthetic polymeric compounds such as polypeptides, e.g., polylysine; and the like. Particularly preferred carrier materials for the practice of the present invention are proteins.

The identity of the protein material utilized in the preparation of a preferred antigen of the present invention is not critical. Examples of preferred proteins useful in the practice of the present invention include mammalian serum proteins, such as for example, human gamma globulin, human serum albumin, bovine serum albumin, rabbit serum albumin and bovine gamma globulin. Other suitable protein products will be suggested to one skilled in the art. It is generally preferred that proteins be utilized which are foreign to the animal hosts in which the resulting antigen will be employed.

Tubocurarine hapten is coupled to the immunogenic carrier material, e.g., a protein, via a linking group derived from an amino acid of the formula

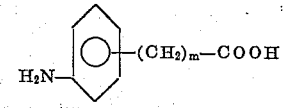

wherein m is as above.

The linkage is effected to the tubocurarine via an azo bond. This bond is formed by diazotization of the amino group of the amino acid and coupling onto the aromatic ring of the tubocurarine hapten.

Diazotization may be carried out by any method known per se for effecting such a reaction. For example, the amino acid can be diazotized by reacting with a metal nitrite, for example, sodium nitrite, in the presence of a mineral acid, for example, hydrochloric acid. The diazonium salt thus formed can be then coupled to the aromatic substrate, the tubocurarine hapten, by contacting the diazonium salt with the tubocurarine. The coupling reaction is preferably effected at a basic pH, for example, from about pH 8 to about pH 12. After the completion of the reaction excess amino acid can be removed by acid extraction.

The tubocurarine coupled via an azo linkage to the amino acid moiety, as described above, hereinafter referred to as "azo-tubocurarine," can then be coupled to the immunogenic carrier material, e.g., a protein, to form the antigen of the present invention. Any techniques well known in protein and peptide chemistry in establishing peptide bonds may be used. Thus, for example, one such technique would involve dissolving the protein and a dehydrating agent in a suitable inert solvent followed by adding a large molar excess of the "azo-tubocurarine." The reaction may be conducted at a temperature in the range of from about 0° to about 50°C., although higher or lower temperatures might be employed depending upon the nature of the reactants and the denaturization temperature of the protein. A most preferable temperature is from about 0° to about room temperature. It is desirable to utilize a slightly acidic reaction medium, e.g., a medium having a pH in the range of from about 3 to about 6.5, most preferably in the range of from about 4 to about 6.5. Upon completion of the reaction, the excess azo-tubocurarine molecules and dehydration reagent may be removed by dialysis. The dialysis may be monitored by checking the dialysate for the presence of azo-tubocurarine or dehydrating agent or, alternatively, may be conducted for a pre-determined period of time, e.g., 3 days. Purified antigen is recovered as a residue in the dialysis bag.

The dehydrating agent which may be used in the aforesaid reaction will be selected from those commonly employed in peptide chemistry for initiating the formation of peptide bond. A particularly suitable group of dehydrating agents comprise the carbodiimides, most preferably dicyclohexyl carbodiimide or 1-ethyl-3-(3-dimethylamino propyl)-carbodiimide. The amount molar excess of the hapten over the protein in the aforesaid reaction will, of course, depend upon the identity of the hapten utilized and the protein selected for the reaction. Generally, a molar excess in the range of from about 100 to about 1,000, most preferably in the range of from about 500 to about 1,000 will be utilized. It is generally found that from about 2 to about 3 tubocurarine groups are added to a molecule of protein depending of course on the amount of molar excess of tubocurarine used in the coupling reaction.

Another useful technique for the preparation of the antigens of the present invention is to first form an activated derivative of the carboxyl group of the azo-tubocurarine moiety and then to react said activated derivative with the protein to form the desired antigen. Suitable activated derivatives include activated esters, such as p-nitrophenyl esters; acyl imidazoles; and so forth. Activated ester derivatives are conveniently prepared from the free acid by reacting said free acid with the desired alcohol in the presence of a suitable dehydrating agent, such as a carbodiimide, under reaction conditions similar to those described above. Acyl imidazoles may be prepared by reacting the free carboxyl group with, for example, carbonyl diimidazole.

The antigen may be prepared from the activated derivative by contacting said activated derivative with the desired protein. As above, the antigen is usually purified by dialysis.

The antigens of the present invention may also be prepared by first coupling the amino acid via an amide linkage to the immunogenic carrier material, for example, a protein, and then coupling this protein derivative, having an aminophenyl group, to the tubocurarine by diazotization of the amino group and coupling as described above. It is generally preferred to first couple the amino acid linking group to the tubocurarine via the azo-linkage, followed by coupling of this azo-tubocurarine to the protein by a peptide linkage.

The antigens of the present invention may be utilized to induce formation of antibodies specific to tubocurarine derivatives, in the serum of host animals by injecting the antigen in such host repeatedly over a period of time, collecting the serum, precipitating the antibody with a neutral salt solution and purifying the antibody by dialysis and column chromatography. Suitable host animals for this purpose include mammals, such as rabbits, horses, goats, guinea pigs, rats, cows, sheep, etc. The resulting antibodies will have a multiplicity of active sites which will selectively complex with tubocurarine derivatives and the above antigens.

The formation of tubocurarine specific antibodies in host animals may be monitored by taking blood samples from the host animals and adding to it an amount of the same tubocurarine-protein antigen used for inoculation. The presence of a precipitate indicates antibody activity. The antigen treatments of the animals can be continued until the antibody titer reaches the desired level of activity. For the purpose of this application, the antibody titer is defined as being the maximum concentration of protein precipitated after the addition of varying known concentrations of antigen to fixed amounts of serum.

The tubocurarine specific antibodies can be isolated from the sera of treated host animals by utilizing techniques well known in the biochemical art. For example, the sera obtained from treated host animals can be acted upon by a neutral salt which will effect precipitation of the desired tubocurarine specific antibodies. Suitable neutral salts for this purpose include sodium sulfate, magnesium sulfate, a sodium hydrogen phosphate mixture or ammonium sulfate. The neutral salt preferred for the purpose of the present invention is ammonium sulfate. Purification techniques subsequent to the precipitation step may also be employed. For example, the obtained antibodies may be further purified by subjecting such antibodies to dialysis and column chromatography. The resulting antibody may be characterized as being a gamma globulin fraction protein having a molecular weight of about 160,000. This antibody will complex with tubocurarine and tubocurarine antigens as described above.

Specific antibodies of the present invention are useful as reagents in biochemical assays for the determination of the presence of tubocurarine derivatives in biological fluids. A particularly preferred assay procedure is an immunoprecipitation procedure which can be used to measure nanogram amounts of tubocurarine derivatives in serum or urine. In such a procedure, a known amount of a labelled tubocurarine derivative is mixed with the tubocurarine specific antibody and a sample containing the unknown quantity of tubocurarine. The amount of tubocurarine in the sample can be determined by measuring the amount of competitive inhibition observed between the binding of the labelled tubocurarine and the sample with the specific antibody, and then calculating the amount of tubocurarine in the sample from a standard curve. Suitable labelled tubocurarine derivatives for this purpose include isotopically labelled tubocurarine, particularly those labelled with tritium and carbon—14, as well as tubocurarine labelled with an electron spin resonance group. Examples of the use of various electron spin resonance labelled molecules in bioassays are to be found in U.S. Pat. Nos. 3,453,288, 3,481,952, and 3,507,876.

The novel antigens and antibodies of the present invention may be utilized in conjunction with conventional additives, buffers, stabilizers, diluents, or in combination with other physiologically active substances. The preparation and use of compositions in obtaining antigens and antibodies in conjunction with physiologically acceptable adjuvants are well known in the art. This invention is further illustrated by the following specific examples. All temperatures are expressed in degrees centigrade.

EXAMPLE 1

Preparation of antigen p-Aminobenzoic acid was dissolved in 10 ml. of 1N HCl at 4°. A solution of 100 mg. sodium nitrite in 0.5 ml. water was added. The excess sodium nitrite was removed by the addition of 600 mg. ammonium sulfamate in 1 ml. water. The solution of diazotized p-aminobenzoic acid was added to a solution of 50 mg. d-tubocurarine chloride in 5 ml. 90 percent aqueous methanol. The pH was adjusted to 10 and the diazonium coupling was allowed to proceed for 2 hours at 0°–5°. The mixture was acidified with 0.1N HCl to pH 1.5 to remove excess p-aminobenzoic acid. The precipitated azo-d-tubocurarine was dissolved in 0.1 NaOH and the mixture was centrifuged to remove excess d-tubocurarine. The azo-d-tubocurarine was extracted into a 4:1 mixture of benzene and methanol and the solvent was removed. The residue was added to a solution of 100 mg. dicyclohexyl carbodiimide dissolved in 10 ml. 0.9 percent sodium chloride solution containing 100 mg. bovine serum albumin. The mixture was allowed to stand overnight at 4° and was then dialyzed versus 0.9 percent sodium chloride for 3 days. The residue remaining in the dialysis bag was the azo-d-tubocurarine-BSA-antigen.

EXAMPLE 2

Preparation of antibody

Rabbits of the New Zealand albino strain were immunized with 1 mg. of azo-d-tubocurarine-BSA-antigen prepared as in example 1. The immunogen was dissolved in phosphate buffered saline, pH 7.4, emulsified with an equal volume of complete Freund adjuvant and injected into the footpads. Booster injections of 100 μg. of antigen in adjuvant were given every 6 to 8 weeks in the footpads and sides.

Antiserum was collected 5 to 7 days after booster injections. Blood collected by cardiac puncture was incubated at 37° for 1 hour and then kept overnight at 4°. After centrifugation at 5,000 rpm for 30 minutes at 4°, serum was separated from the clot.

EXAMPLE 3

Radioimmunoassay

The radioimmunoassay was performed by incubating 0.1 ml. of various dilutions of antisera obtained in example 2 in the presence of 0.1 ml. normal serum from the same animal species, 0.18 ml. of 0.01N phosphate buffered saline, pH 7.2, and 0.025 ml. of a solution of d-tubocurarine dimethyl-$C^{14}$-ether iodide (Amersham-Searle, 112 μc/mg), showing 4,500 cpm, at 4° overnight. After incubation, a neutral saturated ammonium sulfate solution (volume equal to incubation medium) was added to all tubes. The precipitate was sedimented by centrifugation at 5,000 rpm for 15 minutes at 4° and was washed twice at 50 percent ammonium sulfate solution. The washed precipitate, containing antibody-bound labelled d-tubocurarine, was dissolved in 0.5 ml. of commercial detergent solubilizer, such as NCS-solubilizer and quantitatively transferred and counted in a Packard Tri-carb liquid scintillation spectrometer after the addition of 12 ml. of Bray's scintillation solution. The tube which contained no unlabelled d-tubocurarine chloride served as a measure of maximum antibody-bound radioactivity. The addition of increasing amounts of unlabelled d-tubocurarine chloride to a fixed amount of labelled material and antiserum resulted in a competitive inhibition of the labelled material for the formation of the antibody-hapten complex. The data obtained is summarized below in Table 1.

TABLE 1

| Nanograms non-radioactive d-tubocurarine added | Percent inhibition binding of d-tubocurarine dimethyl-$C^{14}$-ether-iodide |
|---|---|
| 0.25 | 10 |
| 0.5 | 30 |
| 1.0 | 36 |
| 5.0 | 70 |
| 10.0 | 80 |

The same results could be obtained by measuring the radioactivity in the supernatant liquid rather than the radioactivity bound to the antibody as precipitate.

The above clearly demonstrates the sensitivity of the method.

Comparison runs were also carried out with other compounds. Dimethyl-d-tubocurarine was strongly bound to the antibody. On the other hand, compounds which do not closely structurally resemble tubocurarine such as acetyl choline, succinyl choline, and neostigmine, were not bound by the antibody.

I claim:

1. An antigen consisting essentially of a tubocurarine derivative coupled to the azo moiety of a linking group of the formula

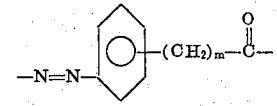

wherein m is an integer of from 0 to 5, said linking group being further coupled by a peptide linkage to an immunogenic carrier material selected from the group consisting of proteins and polypeptides.

2. The antigen of claim 1 wherein said linking group is a p-azo-benzoyl group.

3. The antigen of claim 1 wherein said tubocurarine derivative is of the d-enantiomeric series.

4. The antigen of claim 3 wherein said tubocurarine derivative is d-tubocurarine chloride.

5. The antigen of claim 1 wherein said immunogenic carrier material is a protein.

6. The antigen of claim 5 wherein said protein is bovine serum albumin.

* * * * *